(12) United States Patent
Hoy et al.

(10) Patent No.: US 9,276,932 B2
(45) Date of Patent: Mar. 1, 2016

(54) FEDERATED IDENTITY MAPPING USING DELEGATED AUTHORIZATION

(71) Applicant: International Business Machines Corporation, Armonk, NY (US)

(72) Inventors: Jeffrey Robert Hoy, Southern Pines, NC (US); Jonathan Frederick Brunn, Logan, UT (US); Jessica Whitley Forrester, Raleigh, NC (US); Stephen Carlyle Hess, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/074,396

(22) Filed: Nov. 7, 2013

(65) Prior Publication Data
US 2015/0128242 A1 May 7, 2015

(51) Int. Cl.
H04L 29/06 (2006.01)
G06Q 50/00 (2012.01)

(52) U.S. Cl.
CPC ............ *H04L 63/0884* (2013.01); *H04L 63/08* (2013.01); *G06Q 50/01* (2013.01); *H04L 63/0815* (2013.01)

(58) Field of Classification Search
CPC .. H04L 63/0884; H04L 63/08; H04L 63/0815
USPC ........................................................ 726/2–9
See application file for complete search history.

(56) References Cited

U.S. PATENT DOCUMENTS

| | | | | |
|---|---|---|---|---|
| 7,525,930 B2* | 4/2009 | Fridman | .................. | H04W 8/28 370/254 |
| 7,814,312 B2* | 10/2010 | Parham | ............... | G06Q 20/3674 713/155 |
| 7,849,204 B2 | 12/2010 | Yared et al. | | |
| 8,214,394 B2* | 7/2012 | Krishnaprasad | .. | G06F 17/30427 707/709 |
| 8,396,466 B2* | 3/2013 | Sharma | .................. | H04W 99/00 455/41.2 |
| 8,434,129 B2* | 4/2013 | Kannappan | ............ | G06Q 10/10 726/22 |
| 8,893,230 B2* | 11/2014 | Oberheide | .......... | H04L 63/0884 726/2 |
| 9,098,675 B1* | 8/2015 | Roth | ....................... | G06F 21/00 |
| 2006/0190543 A1* | 8/2006 | Pulver | ..................... | H04L 51/04 709/206 |
| 2012/0072979 A1 | 3/2012 | Cha et al. | | |
| 2012/0197957 A1 | 8/2012 | de Voogd | | |
| 2012/0216268 A1 | 8/2012 | Kassaei et al. | | |
| 2012/0254957 A1 | 10/2012 | Fork et al. | | |
| 2012/0311676 A1* | 12/2012 | Ibasco | .................... | G06Q 10/10 726/4 |
| 2013/0262984 A1* | 10/2013 | Mehr | .................. | G06F 17/2247 715/234 |
| 2014/0032659 A1* | 1/2014 | Marini et al. | ................. | 709/204 |

OTHER PUBLICATIONS

Google.com Code, Account APIs, "OAuth for Web Applications" 2010.

* cited by examiner

*Primary Examiner* — Linglan Edwards
(74) *Attorney, Agent, or Firm* — David B. Woycechowsky; David H. Judson (57) ABSTRACT

A method for identity mapping across web services uses a delegated authorization protocol, such as OAuth. In response to a request from a first user at a first web service, a connection to a second web service is established using the protocol. The second web service responds by sending information associated with a second user of the first web service who previously logged into the second web service from the first web service using the protocol. The second user may be a "contact" of the first user. The information received from the second web service is a access token that was obtained by the second user during that prior login. The access token is provided in lieu of data associated with the second user's account at the second web service. Thereafter, the first web service uses the access token it received to map to an identity of the second user.

21 Claims, 5 Drawing Sheets

FEDERATED IDENTITY MAPPING USING DELEGATED AUTHORIZATION

BACKGROUND OF THE INVENTION

1. Technical Field

This disclosure relates generally to user authentication across services operating in a network environment.

2. Background of the Related Art

The problem of mapping identity across web services, especially social networks, can be very difficult. Several options are available to enable re-use of identity across domains. These include protocols such as OpenID, SAML and other proprietary login systems provided by web services. OpenID, for example, is an open standard that allows users to be authenticated by certain co-operating sites (known as relying parties using a third party service, which eliminates the need for webmasters to provide their own ad hoc systems. With OpenID, users create accounts with their preferred OpenID identity providers, and then use those accounts as the basis for signing on to any website which accepts OpenID authentication. Security Assertion Markup Language (SAML) is an XML-based standard for exchanging authentication and authorization data between security domains, that is, between an identity provider (a producer of assertions) and a service provider (a consumer of assertions). SAML implements the concepts of Identity Providers (source of assertions), and Service Providers (consumers of assertions). The Service Provider (SP) trusts the Identity Provider (IdP) to authenticate the principal. SAML assumes the principal (often a user) has enrolled with at least one identity provider. This identity provider is expected to provide local authentication services to the principal. At the principal's request, the identity provider passes a SAML assertion to the service provider. On the basis of this assertion, the service provider makes an access control decision. To facilitate SAML, a trusted partnership may be set up that comprises IdPs and SPs exchanging metadata about each other's SAML implementation, including keys to encrypt/decrypt the SAML assertions.

While these protocols have advantages, they each depend on the existence of a central identity provider. Often, however, there are situations where a centralized identity provider is insufficient, for example, if a user does not have an identity with that provider, or if the user does not trust a web service with his or her centralized identity. In these cases, protocols for "delegated authorization" are a better choice to the problem of mapping identity across web services.

One such delegated authorization protocol is OAuth, by which users can authorize creation of temporary access tokens to link their accounts between web services without the need for a centralized identity. OAuth is an open protocol that enables users to share their private data between different Web sites along with their credentials but, at the same time, only expose the data on the original Web site where it is held. In other words, the OAuth protocol allows users to share private resources stored on one Web site with other sites without exposing the users' credentials—for example, usernames and passwords—to Web sites other than the one holding the users' data.

While OAuth also provides advantages, it does not explicitly map identity between domains, and it does not enable persisting of long-term relationships across services.

BRIEF SUMMARY

This disclosure describes a technique for federated identity mapping across web services and, in particular, identity mapping across OAuth-enabled services.

According to one embodiment, a method for identity mapping across web services that each uses a delegated authorization protocol (such as OAuth) involves a set of operations that take place at the first web service. In the context of this embodiment, the first web service is sometimes referred to as a data consumer. In particular, and in response to a request from a first user, a secure connection to a second web service is established using the delegated authorization protocol. In the context of this embodiment, the second web service is sometimes referred to as a data supplier to distinguish it from the first web service (the data consumer). In response to the request, given information is then received (at the first web service), the information being transmitted from the second web service. In one embodiment, the given information is associated with a second user of the first web service who previously logged into the second web service from the first web service using the delegated authorization protocol. The second user may be a "contact" of the first user making the request. Preferably, the given information received from the second web service is a delegated authorization access token (e.g., an OAuth token) that was obtained by the second user during that prior login. The delegated authorization access token is provided by the second web service to the first web service in lieu of data associated with the second user's account at the second web service. Thereafter, the first web service uses the delegated authorization access token it received from the second web service to map to an identity of the second user.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
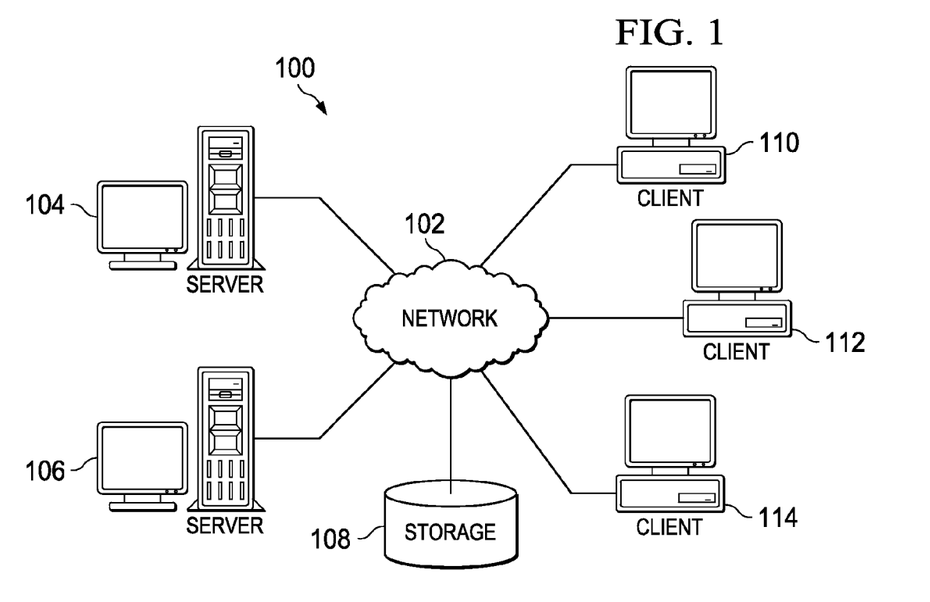
FIG. 1 depicts an exemplary block diagram of a distributed data processing environment in which exemplary aspects of the illustrative embodiments may be implemented.
Figure 2:
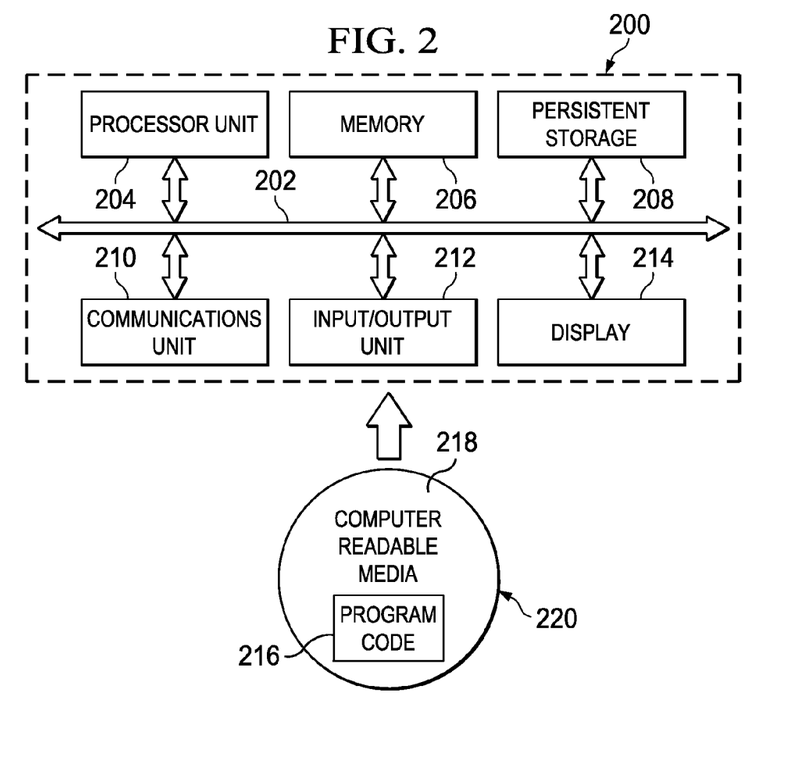
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

The Client-Server Model

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

The Federation Model

As will be described, the techniques described herein find utility in the context of a "federated" environment. Thus, the following background is provided. In general, an enterprise has its own user registry and maintains relationships with its own set of users. Each enterprise typically has its own means of authenticating these users. However, in a federated scheme, enterprises cooperate in a collective manner such that users in one enterprise can leverage relationships with a set of enterprises through an enterprise's participation in a federation of enterprises. Users can be granted access to resources at any of the federated enterprises as if they had a direct relationship with each enterprise. Users are not required to register at each business of interest, and users are not constantly required to identify and authenticate themselves. Hence, within this federated environment, an authentication scheme allows for a single-sign-on experience within the rapidly evolving heterogeneous environments in information technology.

As is well-known, a federation is a set of distinct entities, such as enterprises, logical units within an enterprise, organizations, institutions, etc., that cooperate to provide a single-sign-on, ease-of-use experience to a user; a federated environment differs from a typical single-sign-on environment in that two enterprises need not have a direct, pre-established, relationship defining how and what information to transfer about a user. Within a federated environment, entities provide services which deal with authenticating users, accepting authentication assertions (e.g., authentication tokens) that are presented by other entities, and providing some form of translation of the identity of the vouched-for user into one that is understood within the local entity.

Federation eases the administrative burden on service providers. A service provider can rely on its trust relationships with respect to the federation as a whole; the service provider does not need to manage authentication information, such as user password information, because it can rely on authentication that is accomplished by a user's authentication home domain or an identity provider. A federated environment allows a user to authenticate at a first entity, which may act as an issuing party to issue an authentication assertion about the user for use at a second entity. The user can then access protected resources at a second, distinct entity, termed the relying party, by presenting the authentication assertion that was issued by the first entity without having to explicitly re-authenticate at the second entity. Information that is passed from an issuing party to a relying party is in the form of an assertion, and this assertion may contain different types of information in the form of statements. For example, an assertion may be a statement about the authenticated identity of a user, or it may be a statement about user attribute information that is associated with a particular user. Furthermore, this information can be used by a relying party to provide access to the relying party's resources, based on the relying party's access control rules, identity mapping rules, and possibly some user attributes that are maintained by the relying party.

An identity provider (IdP) is a specific type of service that provides identity information as a service to other entities within a federated computing environment. With respect to most federated transactions, an issuing party for an authentication assertion would usually be an identity provider; any other entity can be distinguished from the identity provider. Any other entity that provides a service within the federated computing environment can be categorized as a service provider. Once a user has authenticated to the identity provider, other entities or enterprises in the federation may be regarded as merely service providers for the duration of a given federated session or a given federated transaction.

Although it may be possible that there could be multiple enterprises within a federated environment that may act as identity providers, e.g., because there may be multiple enterprises that have the ability to generate and validate a user's authentication credentials, etc., a federated transaction usually involves only a single identity provider. If there is only a single federated entity that is able to authenticate a user, e.g., because there is one and only one entity within the federation with which the user has performed a federated enrollment or registration operation, then it would be expected that this entity would act as the user's identity provider in order to support the user's transactions throughout the federated environment.

By way of additional background, OAuth is an open protocol which enables users to share their private data between different Web sites along with their credentials, but only expose the data on the original Web site where it is held. As described briefly above, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users.

Figure 3:
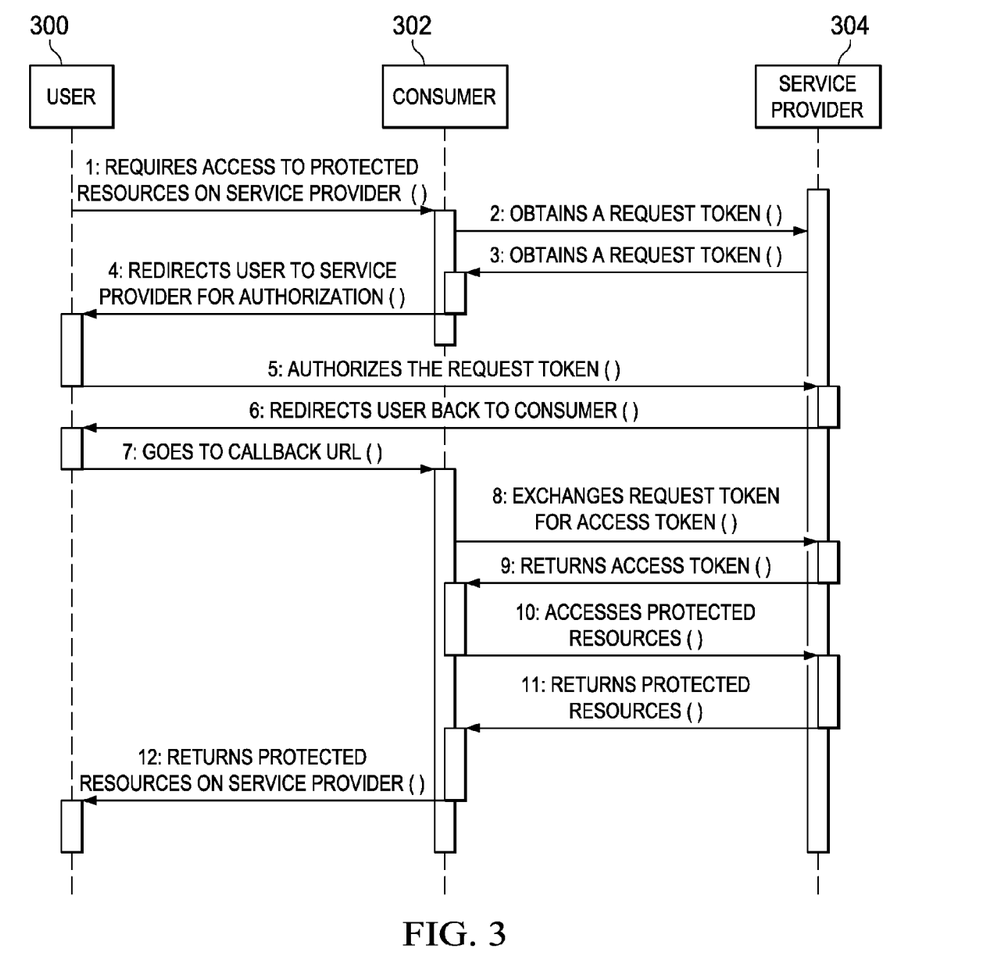
FIG. 3 illustrates OAuth delegated authorization.

The use of OAuth is shown in FIG. 3 with respect to a consumer-facing website. As illustrated in FIG. 3, in this embodiment there are three (3) players in OAuth: a user 300, a consumer 302, and a service provider 304. A typical OAuth interaction scenario can be described as follows. By way of background, it is assumed that the service provider 304 is a photo sharing website that holds or stores some private photos for the user 300. It is also assumed that the site, however, does not provide a print service. Thus, when the user 300 wants to print his or her photos, he or she can go to another site, such as a photo printing site, which is represented by the consumer 302, which in this example scenario provides a print service. The printer site (consumer 302), however, does not have the user's photos and must obtain the desired photos from the photo sharing site (service provider 304). Therefore, there must exist an appropriate data flow from photo sharing site 304 to photo printing site 302. OAuth facilitates this process. In particular, if the photo sharing site 304 allows authentication using OAuth, then when the user 300 wants to print photos (held on the printing site 302), site 302 redirects the user 300 to site 304 to grant it (site 302) access to the user's photos. The user also may be prompted to give permission to site 302 for reading the photos, or permission may be pre-set so this step can be skipped. When this is done, the user is redirected to the printer site 302. Now, the printer site 302 has permission to read the user's photos from the photo sharing site 304 and will be able to print that user's photos on demand. In all the steps, the printer site 302 does not know the user's credentials for logging into the photo sharing site 304. In this manner, the user's privacy is better protected.

FIG. 3 illustrates the above process in a simplified sequence flow diagram. At step 1, a user issues a request to the printing site 302. This request may be made using a conventional web browser. The request indicates a desire of the user to access one or more protected resources on the service provider, namely, on photo sharing site 304. At step 2, the printing site 302 makes a request to the photo sharing site 304 to obtain an OAuth request token. The service provider responds at step 3 by returning the request token. At step 4, the printing site 302 issues to the user's browser an HTTP redirect. The redirect causes the browser to initiate step 5, by which the browser makes a request to the service provider 304 to authorize the request token. At step 6, the service provider issues a redirect back to the user. This redirect, however, causes the browser to initiate step 7, by which the browser issues a callback URL to the printer site 302. At step 8, the printer site 302 exchanges the request token for an OAuth access token. Because the printer site has established its rights, the service provider responds by returning the access token to the printer site 302. This is step 9. At step 10, the printer site 302 makes the request to the service provider to access the protected resources originally requested by the user (in step 1). The protected resources are then returned from the service provider to the printing site at step 11 because the printing site has established that is has permission to read the user's photos. At step 12, the printing site returns to the requesting user the protected resources. This completes the process.

The following discussion assumes the reader's familiarity with the principles of OAuth 2.0 (Internet Request for Comment 6749).

Federated Identity Mapping Using Delegated Authorization

With the above as background, the subject matter of this disclosure is now described.

The federated identity mapping techniques herein are operative across cooperating (e.g., at least first and second) web services that each uses a same delegated authorization protocol, such as OAuth 2.0. As is well-known, a typical web service is a network-accessible (e.g., via HTTP or HTTPS) server that supports a web site or web application (or some combination thereof). End user clients (operating browsers or mobile apps) may access the individual web services in a conventional manner (e.g., by navigating to a URL or domain). In addition, a particular web service is assumed to have the capability to access the other web service (or vice versa), typically using the delegated authorization protocol. As is well-known, an OAuth interaction typically involves an OAuth client component, and an OAuth server (provider) component. It is further assumed that users authorize a web service using OAuth in the known manner. As such, the OAuth server component generates the access tokens, and the OAuth client stores the access tokens. When first and second web services interact with one another using OAuth according to this disclosure, typically they do so over secure (e.g., SSL, TLS) connections operating over one or more public and/or private, wireline and/or wireless networks When an OAuth provider (such as the OAuth provider operating at a web service) generates an access token, it is assumed that the provider associates that token with the user account that the token authorizes. Likewise, when receiving the access token, the OAuth client associates the token with a user account. As a result, both the OAuth provider and the OAuth client have a unique, agreed-upon "client⇆provider identity" for the user. As will be described, this identity can be persisted independently of the access token, and the mapping remains valid even if the token's access right expires. The federated identity mapping technique of this disclosure exploits this property by using the access tokens (in lieu of user account information) to share information across web services via the delegated authorization protocol.

Figure 4:
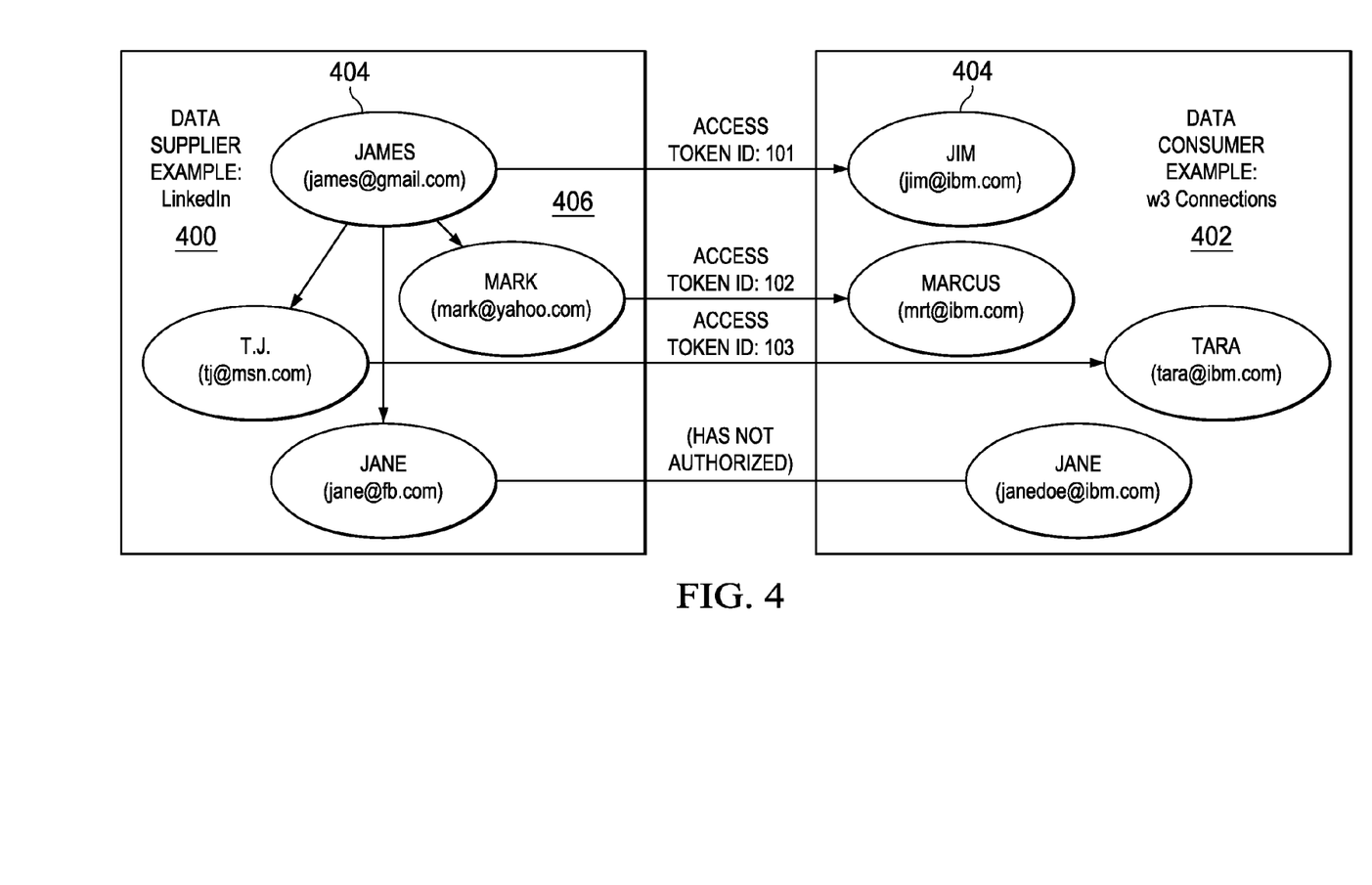
FIG. 4 illustrates a pair of cooperating web services (e.g., social networks) that use the identity mapping technique of this disclosure to facilitate data sharing.

FIG. 4 illustrates a pair of cooperating web services (e.g., social networks) that use the identity mapping technique of this disclosure to facilitate data sharing (e.g., data about users, a user's "contacts" or "contact list," or the like). While the following discussion illustrates the techniques of this disclosure in the context of sharing user contact data, this is not a limitation, as the approach may be generalized and used for sharing other types of data. An underlying assumption of the identity mapping approach is that an entity requesting the data is authorized to receive it. For convenience, this disclosure omits details regarding any user authentication/authorization and assumes that the data sharing is permitted.

In particular, and for purposes of illustration only, FIG. 4 depicts a pair of social networks 400 and 402. The example of using social networks is for convenience only, as the techniques herein may be implemented irrespective of the nature of the web service provided by the cooperating services. As used herein, the word "cooperating" is also a short-hand for an indication that the web services are interacting with one another using the delegated authorization protocol (in this case OAuth). It is also assumed that an end user that initiates a data sharing operation (as will be described) is or has been authenticated to each of the cooperating web services (e.g., and thus has a user account at each such web service). The end user's identity at each web service, however, may differ.

In this example, a first one of the social networks 400 is a "data supplier," while the other of the social networks 402 is a "data consumer." The identification of one of the networks as a supplier and the other as a consumer is arbitrary and of course depends on the nature and direction of the data transfer. In this example, the data supplier is LinkedIn (www.linkedin.com), and the data consumer is IBM® Connections, a social software platform. Of course, these are just representative social networks in which the disclosed subject matter may be implemented. In this example, a user desires to import his or her certain contacts from LinkedIn (the data supplier) to a new social network, namely IBM Connections (the data consumer). More specifically, it is assumed that end user "Jim" 404 is starting as a new employee at IBM; he has a large network of contacts 406 on LinkedIn, and his goal is import his colleagues on LinkedIn that are also working at IBM. The ability to export/import between social networks is generally not possible unless the networks share a global identifier, such as a Jim's e-mail address. In this example scenario, it is assumed that no such identifier exists and that the federated identity mapping technique of this disclosure is implemented to address this deficiency. As illustrated, in LinkedIn, Jim uses the userID "James" 408 and the e-mail address james@gmail.com, although in Connections he uses "Jim" and jim@ibm.com. LinkedIn contacts 406 include Mark (mark@yahoo.com), T.J. (tj@msn.com), and Jane (jane@fb.com).

Figure 5:
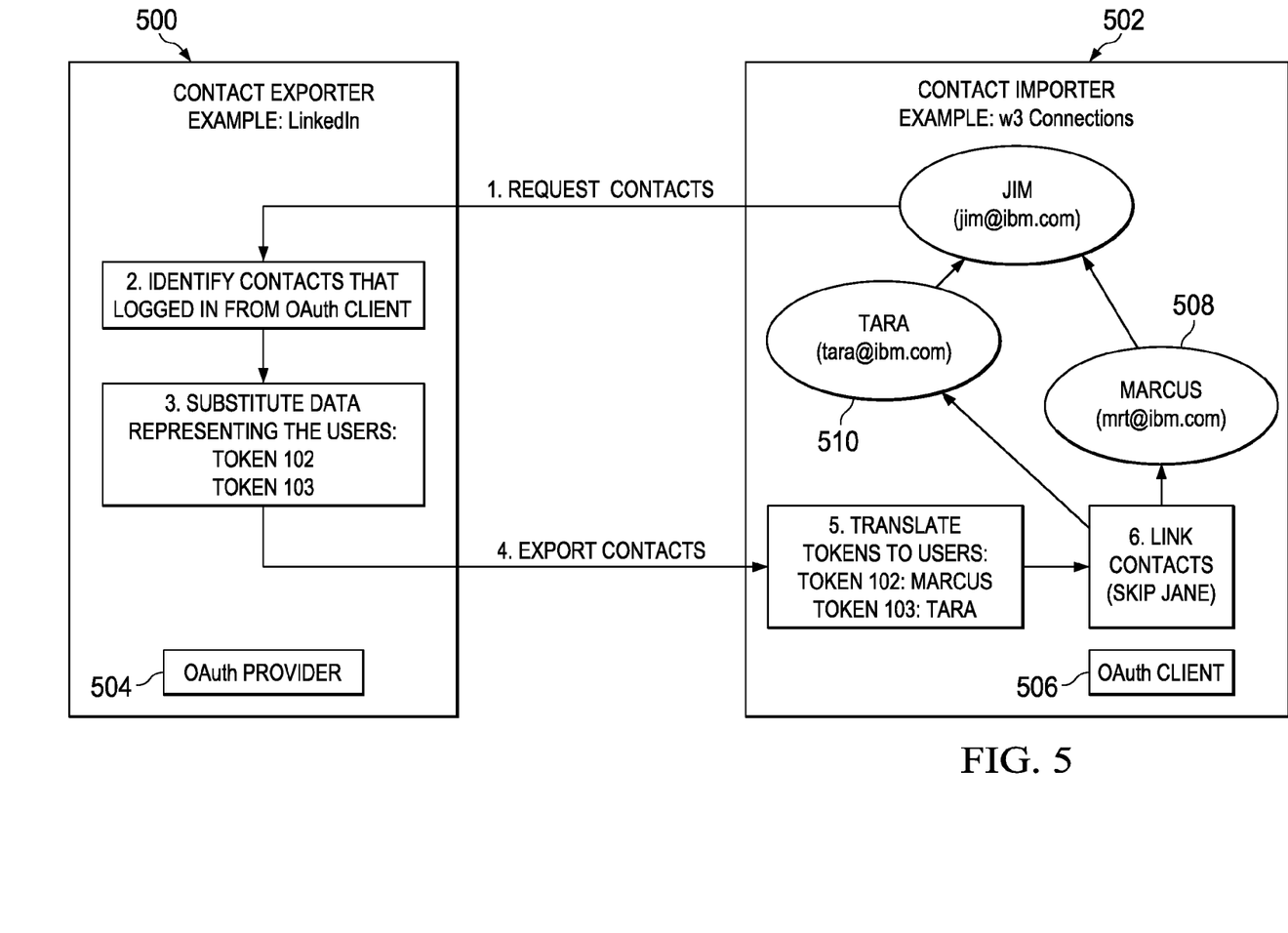
FIG. 5 illustrates how a user at a first social network can use the identity mapping technique of this disclosure to obtain the user's set of contacts existing at a second social network.

FIG. 5 illustrates how James, as the user at a first social network 402, can use the identity mapping technique of this disclosure to obtain his set of contacts existing at the second social network 400. Referring now to FIG. 5, a specific example is shown wherein Jim imports his contacts from the data supplier's social network using a system based on federated identity mapping that leverages delegated authorized access tokens according to this disclosure. The interaction begins when Jim logs into the data consumer, in this example IBM Connections 502. Jim then uses the data consumer's OAuth client 506 to connect to the OAuth provider 504 of the data supplier, in this example LinkedIn 500, using his "James" account. At step (1) as shown, James makes a request for his contacts. As will be seen, this operation leverages OAuth and the federated identity mapping technique of this disclosure to export these contacts from the data supplier. At step (2) as shown, the data supplier identifies all contacts of James that have previously logged in from the data consumer's domain using OAuth. Token ID: 102 (Mark) and Token ID: 103 (T.J.) are identified. At step (3), the data supplier 500 replaces the data supplier's user identifiers (e.g., name, e-mail) with the access tokens originally generated for each of those users and then transmits (to the requesting web service 500) the tokens in lieu of the user account information. At step (4), the data consumer site 502 receives the exported list of users and their access tokens. At step (5), the data consumer finds the users associated with those access tokens, and this operation can be done without the data consumer ever knowing Jim's account ID on the data supplier's domain. At step (6), the data consumer links Jim's profile with the users exported from the data supplier.

The result of this linkage (the identity mapping) is shown in FIG. 4. In this example, the contact Mark at LinkedIn is now Marcus 508, at mrt@ibm.com; the contact T.J. at LinkedIn is now Tara 510, at tara@ibm.com. Jim's friend Jane could also be a contact in the new domain (because she was in Jim's network of contacts at LinkedIn), however, because Jane has never logged into the data supplier from the data consumer using OAuth, she is not automatically imported as a contact. If and when Jane later does log into the data supplier's service from the data consumer using OAuth, the data supplier may then notify James and Jane that they should get associated on the data consumer's domain. This completes the identity mapping example.

The identity mapping functionality described above may be implemented in the OAuth client or OAuth provider component, as the case may be. In an alternative implementation, the identity mapping functionality is code that is accessible (callable) by the respective OAuth component. Thus, e.g., the function may be implemented in a linked library, as a plug-in, or in some other similar manner.

Figure 6:
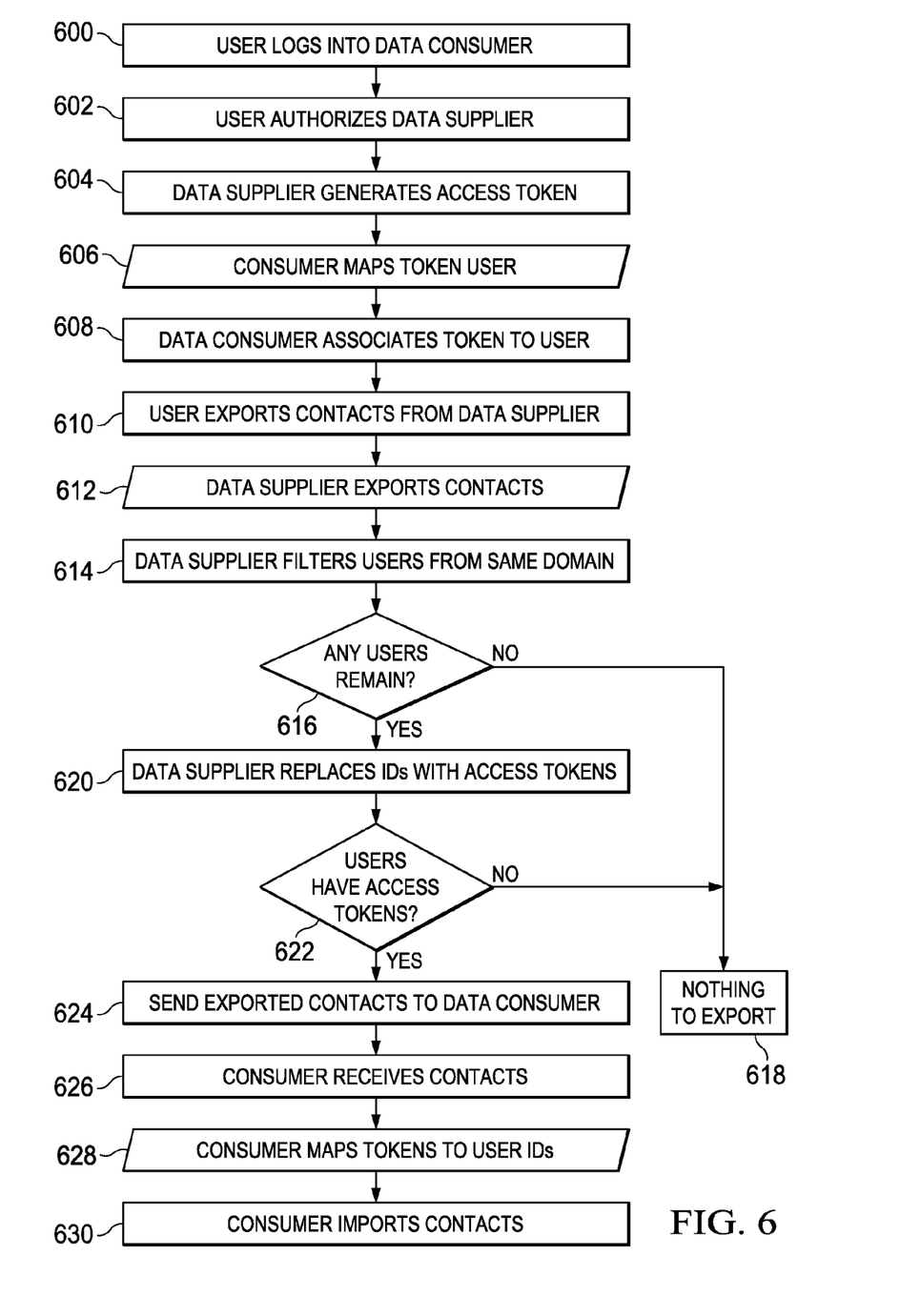
FIG. 6 is a process flow describing the contact list transfer functionality in more detail.

FIG. 6 illustrates a process flow describing a contact list transfer function, which is one representative example of how identity mapping may be carried out according to this disclosure. For convenience of illustration, the process flow combines various operations, some of which take place at the data consumer service, while other operations take place at the data supplier site. The routine begins with a set of operations at the data consumer web service. The routine begins at step 600 when the user logs into the data consumer. At step 602, the user authorizes the data supplier via OAuth. At step 604, the data supplier generates and provides an access token. The routine then continues with a set of operations that occur at the data consumer. In particular, at step 606, the data consumer maps the token to the user. The routine then continues at step 608 with the data consumer associating the token to the user. At step 610, the user then makes a request to export his or her contacts from the data supplier. At this point, control moves back to the data supplier. In particular, the data supplier exports the contacts at step 612 using a set of sub-steps (steps 614, 616, 620, 622 and 624). In particular, the data supplier filters users from the same domain at step 614. At step 616, the data supplier tests to determine whether any users remain. If not, the routine branches and ends at step 618 (as there are no contacts to export). If, however, the outcome of the test at step 616 indicates that users remain, the routine continues at step 620 with the data supplier replacing identifiers with access tokens. The routine then continues at step 622 by the data supplier testing whether the users have access tokens. If not, the routine again branches to step 618 and ends. If there are users with access tokens, the routine continues at step 624 with the data supplier sending exported contacts to the data consumer. This completes the set of sub-steps. Control then returns back to the data consumer. The data consumer receives the contacts at step 626. At step 628, the data consumer maps the tokens to user identifiers in the domain. The data consumer then imports the contacts at step 630 to complete the process.

As one of ordinary skill in the art will appreciate, the mapped identity is useful primarily to identify other users in the same system, although this is not a limitation.

An optional extension is now described. In some cases the OAuth access tokens may be undesirable to be used as the identity map. For example, if the "export contacts" cannot be exported securely (using SSL or TLS), in which case "fake" tokens may be generated between the OAuth provider and client. These fake tokens have no authorized access but which are used solely for identity mapping. Such tokens could be generated without changing the OAuth 2.0 protocol, for example, by specifying an authorization scope of "none." The OAuth protocol also could be modified or extended in a way understood by the client and the provider to generate additional unique identity mapping tokens during the OAuth interaction.

The token sharing and identity mapping techniques of this disclosure enable a set of (at least two or more) web services to cooperate between and among each other to facilitate data sharing. For example, if the Connections OAuth client were connected to an OAuth provider on LinkedIn, LinkedIn could export its users that are Connections users. Upon such export, LinkedIn would replace user identities with authorization tokens. Connections would then lookup the tokens when the exported users are received, and then accurately map identities between systems. LinkedIn could also export contacts of a given user that also uses Connections, with the same alterations to the user identities. A Connections user can then import their LinkedIn contacts on Connections, with the additional mapping run by Connections. As another alternative, Connections could export contacts of a given user that uses LinkedIn. Connections would replace the Connections-specific user identifiers with the user access tokens. Upon receiving the user list, LinkedIn can then map the access tokens to users. In each of the cases, the federated identity mapping may not be complete, as only users that have connected between the two services would have unique identifiers across the services. This is sometimes referred to as a "partial identity mapping" of users. There is no guarantee that all users have connected, nevertheless, typically the completeness would grow over time, and even an incomplete map is useful in certain circumstances. Of course, the above are merely representative data sharing examples that may benefit from the identity mapping scheme.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The particular deployment scenario described above is not a limitation of this disclosure. The techniques described herein may be used in any deployment scenario (including, without limitation, for providing mobile access to web and other social network-based resources).

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, Liberty, Shibboleth, OpenID, WS-Federation, Cardspace, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As has been described, the scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the layered logout function is implemented in software, which includes but is not limited to firmware, resident software, microcode, and the like. The data can be configured into a data structure (e.g., an array, a linked list, etc.) and stored in a data store, such as computer memory. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the service provider components are implemented in a special purpose computer, preferably in software executed by one or more processors. The associated catalog configuration is stored in an associated data store. The software also is maintained in one or more data stores or memories associated with the one or more processors, and the software may be implemented as one or more computer programs.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As used herein, the delegated authorization protocol is preferably OAuth, but other such protocols may be used as well.

Of course, the identification of any commercial product herein is not meant to be taken to limit the disclosed subject matter.

Having described our invention, what we now claim is as follows.

The invention claimed is:

1. A method, comprising:
    connecting a first web service that uses a delegated authorization access protocol to a second web service that uses the delegated authorization protocol;
    receiving, by the first web service, a request from a first user;
    in response to receipt of the request, requesting and receiving, by the first web service and from the second web service, information about a second user of the first web service that previously logged into the second web service from the first web service using the delegated authorization protocol, the information including a delegated authorization access token obtained by the second user during that prior login; and
    mapping, by the first web service, the delegated authorization access token to an identity of the second user in the first web service to accomplish identity mapping across the first and second web services.

2. The method as described in claim 1 wherein the delegated authorization protocol is OAuth.

3. The method as described in claim 2 wherein the delegated authorization access token is an OAuth access token generated by the first web service and that has been substituted for a user identifier of the second user.

4. The method as described in claim 1 wherein the second user is a contact of the first user at the first web service.

5. The method as described in claim 4 wherein, by virtue of the mapping of the delegated authorization access token, the second user becomes a contact of the first user at the second web service.

6. The method as described in claim 1 further including transmitting to the second web service information associated with at least one contact associated with the first user.

7. The method as described in claim 6 wherein the information transmitted to the second web service is a delegated authorization access token that replaces a user identifier associated with the at least one contact.

8. Apparatus, comprising:
    a processor;
    computer memory holding computer program instructions that when executed by the processor performs identity mapping by:
        connecting a first web service that uses a delegated authorization access protocol to a second web service that uses the delegated authorization protocol;
        receiving, by the first web service, a request from a first user;
        in response to receipt of the request, requesting and receiving, by the first web service and from the second web service, information about a second user of the first web service that previously logged into the second web service from the first web service using the delegated authorization protocol, the information including a delegated authorization access token obtained by the second user during that prior login; and
        mapping, by the first web service, the delegated authorization access token to an identity of the second user in the first web service to accomplish identity mapping across the first and second web services.

9. The apparatus as described in claim 8 wherein the delegated authorization protocol is OAuth.

10. The apparatus as described in claim 9 wherein the delegated authorization access token is an OAuth access token generated by the first web service and that has been substituted for a user identifier of the second user.

11. The apparatus as described in claim 8 wherein the second user is a contact of the first user at the first web service.

12. The apparatus as described in claim 11 wherein, by virtue of the mapping of the delegated authorization access token, the second user becomes a contact of the first user at the second web service.

13. The apparatus as described in claim 8 further including transmitting to the second web service information associated with at least one contact associated with the first user.

14. The apparatus as described in claim 13 wherein the information transmitted to the second web service is a delegated authorization access token that replaces a user identifier associated with the at least one contact.

15. A computer program product in a non-transitory computer-readable storage medium for use in a data processing system, the computer program product holding computer program instructions which, when executed by the data processing system, perform a method, the method comprising:
    connecting a first web service that uses a delegated authorization access protocol to a second web service that uses the delegated authorization protocol;
    receiving, by the first web service, a request from a first user;
    in response to receipt of the request, requesting and receiving, by the first web service and from the second web service, information about a second user of the first web service that previously logged into the second web service from the first web service using the delegated authorization protocol, the information including a delegated authorization access token obtained by the second user during that prior login; and mapping, by the first web service, the delegated authorization access token to an identity of the second user in the first web service to accomplish identity mapping across the first and second web services.

16. The computer program product as described in claim 15 wherein the delegated authorization protocol is OAuth.

17. The computer program product as described in claim 16 wherein the delegated authorization access token is an OAuth access token generated by the first web service and that has been substituted for a user identifier of the second user.

18. The computer program product as described in claim 15 wherein the second user is a contact of the first user at the first web service.

19. The computer program product as described in claim 18 wherein, by virtue of the mapping of the delegated authorization access token, the second user becomes a contact of the first user at the second web service.

20. The computer program product as described in claim 15 further including transmitting to the second web service information associated with at least one contact associated with the first user.

21. The computer program product as described in claim 20 wherein the information transmitted to the second web service is a delegated authorization access token that replaces a user identifier associated with the at least one contact.

* * * * *